Jan. 29, 1963  D. PIMENTEL  3,075,316
RODENT EXTERMINATOR
Filed June 1, 1960  3 Sheets-Sheet 1

Demetrio Pimentel
INVENTOR.

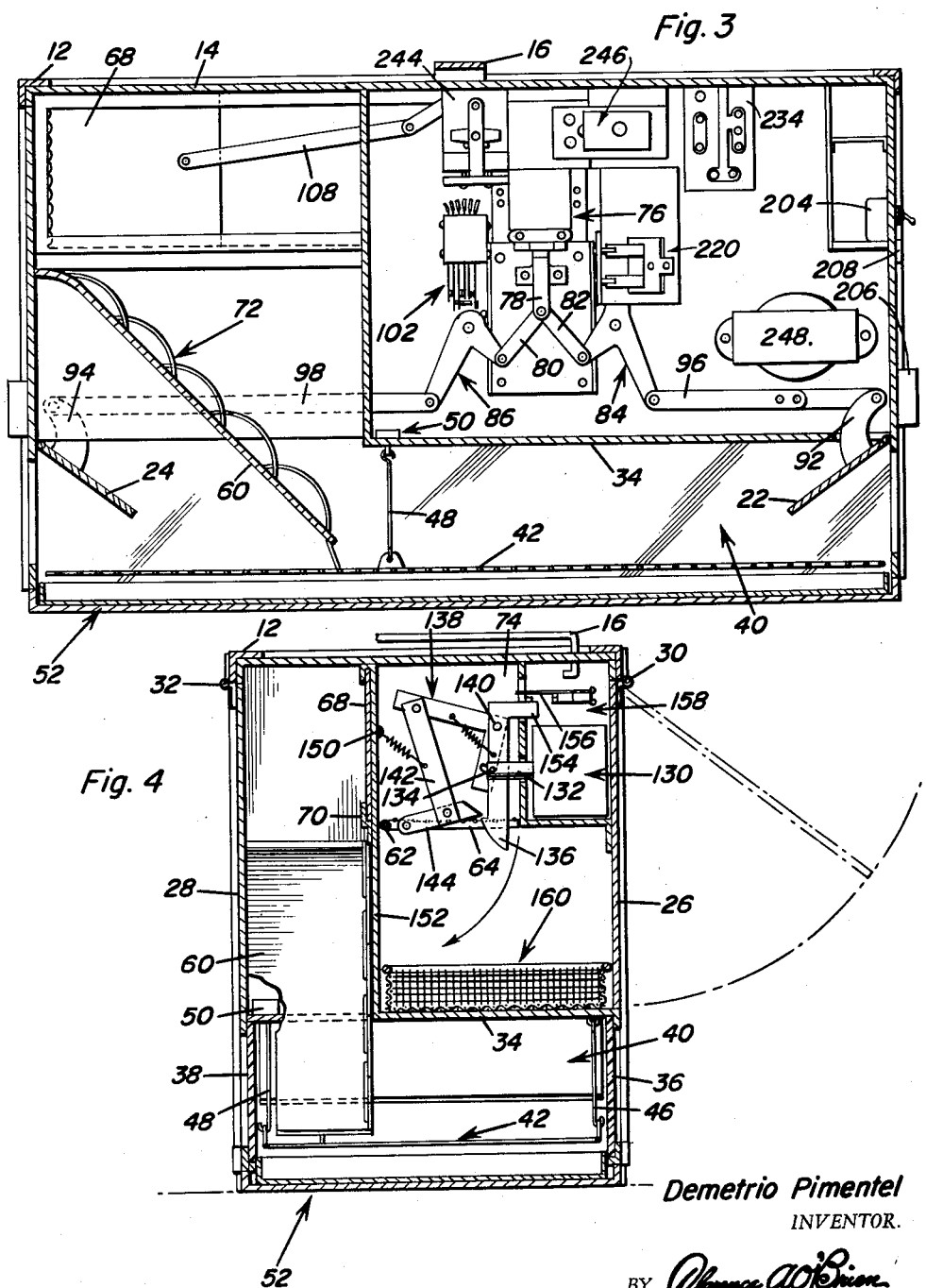

Jan. 29, 1963 D. PIMENTEL 3,075,316
RODENT EXTERMINATOR
Filed June 1, 1960 3 Sheets-Sheet 3

Demetrio Pimentel
INVENTOR.

BY Clarence A. O'Brien
and Harvey B. Jacobson
Attorneys

United States Patent Office 3,075,316
Patented Jan. 29, 1963

3,075,316
RODENT EXTERMINATOR
Demetrio Pimentel, 184 McDougal St.,
Brooklyn 33, N.Y.
Filed June 1, 1960, Ser. No. 33,154
12 Claims. (Cl. 43—67)

This application is a continuation in part application of U.S. Serial No. 696,133, filed November 13, 1957 and now Patent No. 2,995,862.

This invention relates generally to an improved rodent exterminator and more particular to a device which attracts, kills, and disposes of rodents, automatically resetting itself for repeated operation.

Many different types of exterminating devices are known to the prior art. Several of the simpler pertinent prior art devices are merely traps which attract the rodent and then prevent his escape. Others combine exterminating features with the trapping with the method of extermination often comprising the impact of perhaps a spring urged member. Still other devices utilize high voltage electrical means for exterminating the trapped rodent. It is the principal object of this invention to provide a novel and improved rodent exterminator of the latter type wherein a rodent is initially attracted to a trapping compartment and from there urged by heat to an exterminating compartment which includes exposed high voltage conductors. The rodent engages a switch actuator in the exterminating compartment and causes a high voltage to be impressed on the exposed conductors which quickly electrocutes the rodent. The invention therefore lies in the particular features and refinements in electrical rodent exterminators.

It is a more particular object of this invention to provide a novel and improved rodent exterminator device wherein the rodent is attracted to the device and trapped therein, urged toward an exterminating compartment, electrocuted therein, and deposited in a rodent storage compartment which is removable from the rodent exterminator housing allowing for the ultimate disposal of the dead rodents without requiring the user to touch the dead animals.

It is a still more particular object of this invention to provide a novel rodent exterminator utilizing electrical means for electrocuting an attracted and trapped rodent wherein the device is characterized by means which render the operation thereof completely automatic and continuous. That is, after one rodent is attracted, he is trapped and urged along a predetermined path, electrocuted and disposed of into the storage chamber. The device immediately resets itself so as to attract and receive another rodent for similar treatment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged vertical sectional view taken substantially along the plane 3—3 of FIGURE 2;

FIGURE 4 is an enlarged vertical sectional view taken substantially along the plane 4—4 of FIGURE 2;

Figure 1:
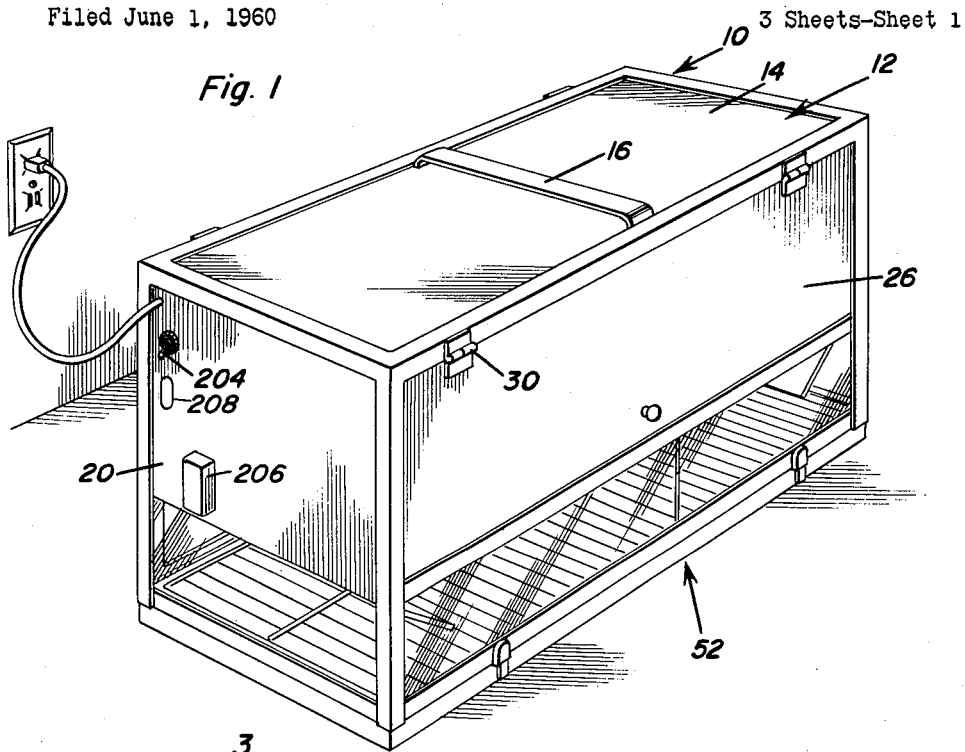
FIGURE 1 is a perspective view of the rodent exterminator particularly showing the external characteristics of two sides of the housing.

With continuing reference to the drawings, numeral 10 generally represents the rodent exterminator including a frame housing 12 which is in the form of a rectangular box. A top panel 14 is mounted in the housing 12 and a handle 16 is provided thereover for facilitating the carrying of the exterminator 10. End panels 18 and 20 are provided each having doors 22 and 24 respectively hinged thereto at the lower end thereof. Side panels 26 and 28 are hinged to the housing 12 as at 30 and 32 respectively. The side panels 26 and 28 extend downwardly from the top panel 14 terminating proximate a horizontal partition 34 within the housing. Transparent members 36 and 38 are disposed below the side panels 26 and 28 as particularly shown in FIGURE 4.

Figure 2:
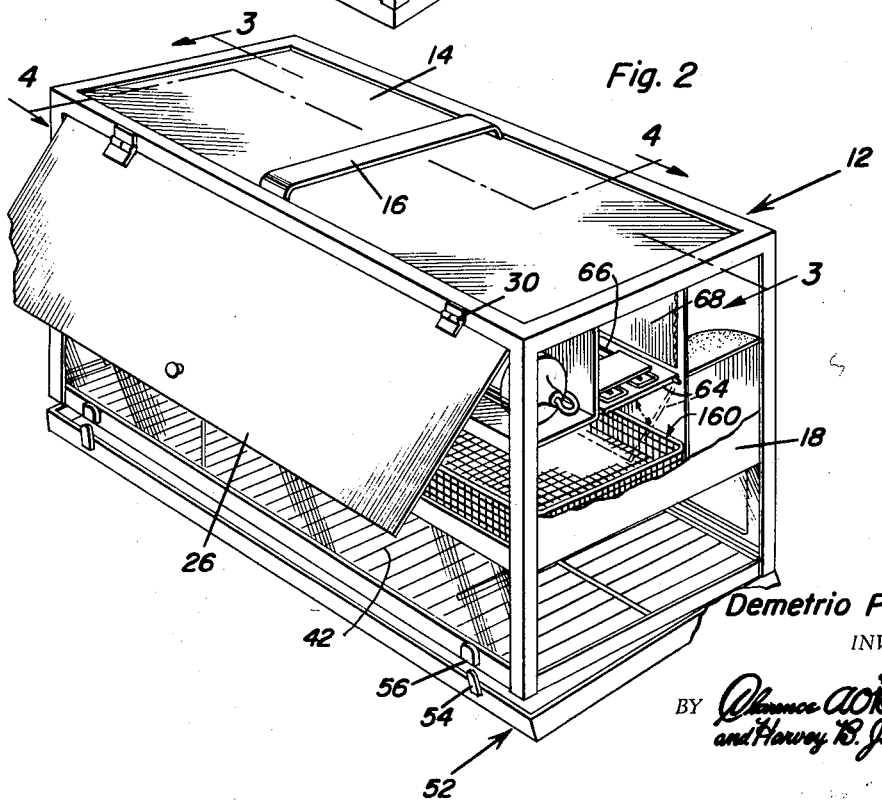
FIGURE 2 is a perspective view, partially broken away, of the rodent exterminator particularly showing two sides of the housing not illustrated in FIGURE 1 and particularly illustrating how the foot compartment is utilized with the remaining portion of the housing.

Between the members 36 and 38 and the pivotally mounted doors 22 and 24 is defined a trapping compartment 40. The trapping compartment 40 includes a floor grill 42 having a plurality of spaced parallel rods. The floor grill 42 is supported from hangers 46 and 48 extending to the partition 34. At least one of the hangers, as 48, is operatively associated with a normally open switch 50 to be discussed in greater detail. The floor grill 42 is substantially open and accordingly a member 52 constituting a food compartment is adapted to be disposed therebelow in substantial communication therewith. Projections 54 may be secured to the member 52 receivable in slotted elements 56 on the housing 12. Particularly referring to FIGURE 2, it will be noted that the housing 12 may be so rested on the member 52 that the projections 54 are received within the element 56. Food may be placed within the member 52 constituting a food compartment. The food therein will be visible and also will emit an odor through the floor grill 42 noticeable to a rodent outside of the housing 12. The food in the member 52 accordingly is able to attract a rodent through the housing entrances adjacent the housing doors 22 and 24.

A ramp 60 is secured within the trapping compartment 40 and is inclined from the floor grill 42 of the trapping compartment 40 to an elevation in alignment with the shaft 62 horizontally mounted in the housing 12. A floor 64 is pivotally mounted on the shaft 62. The floor 64 has supported thereon exposed high voltage conductors 66 shown in FIGURES 4 and 6. A slidable door 68, slidable in angle member 70 separates the ramp 60 from the shaft 62. Heating means in the form of an electrical heating coil preferably, designated as 72 are mounted on the ramp 60 within the trapping compartment 40.

Figure 5:
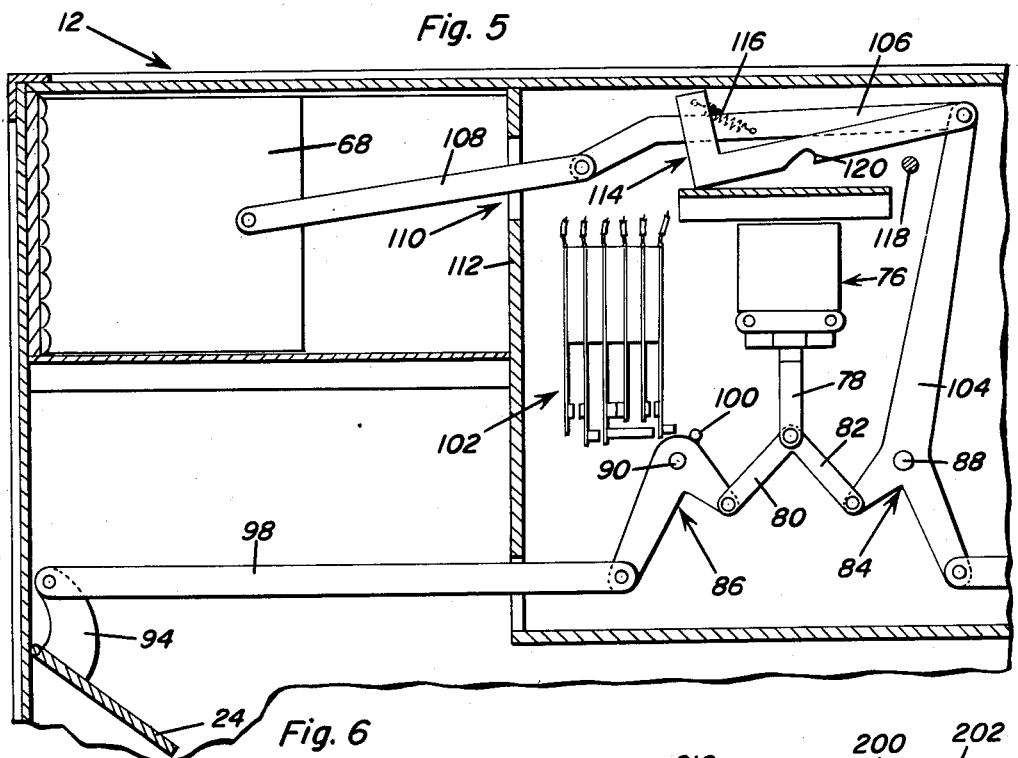
FIGURE 5 is an enlarged fragmentary sectional view particularly illustrating the door actuator assembly and switch means associated therewith.

A door actuator assembly illustrated in FIGURE 5 is provided for coordinating the action of the housing doors 22 and 24 and the exterminator compartment door 68. The exterminator compartment is that particular portion of the housing disposed immediately above the floor 64 and is generally designated by the numeral 74. The door actuator assembly shown in FIGURE 5 includes an assembly solenoid 76 securely mounted in the housing 12. An armature 78 is operatively connected to the solenoid 76 for reciprocal movement in response to energization of the solenoid 76. The armature 78 is terminally bifurcated defining portions 80 and 82 which are respectively pivoted to bell cranks 84 and 86 and in turn pivoted in the housing at 88 and 90 respectively. Each of the doors 22 and 24 is provided with a substantially perpendicular projection 92 and 94. Rods 96 and 98 respectively connect the bell cranks 84 and 86 to the projections 92 and 94 on the doors 22 and 24. It will be appreciated that when the armature 78 is extended from the assembly solenoid 76 in its normal position, the doors 22 and 24 are open so as to allow the entrance of a rodent into the trapping compartment 40. It will first be appreciated that if the assembly solenoid 76 is energized, the armature 78 will be retracted so as to pivot the bell crank 84 clockwise as shown in FIGURE 5 and the bell crank 86 counterclockwise as shown in FIGURE 5 so as to close both of the doors 22 and 24. A projection 100 fixed to the bell crank 86 is so disposed so as to engage a switch bank 102, more particularly described below, when the bell crank 86 is pivoted. The bell crank 84 has a long extension 104 formed integral therewith which is terminally pivoted to an arm 106 which in turn is terminally pivoted to an arm 108 reciprocably movable through opening 110 in partition 112. Arm 108 is pivoted to slidable exterminating compartment door 68. An angle member 114 is pivoted to the arms 106 and 104 at their common pivot point and a spring 116 is fixed between the arm 106 and the angle 114 as shown in FIGURE 5. A reciprocably movable pin 118 is provided. The angle member 114 is recessed at 120. When the armature 78 is retracted and the bell crank 84 pivoted clockwise, the angle member 114 is drawn to the right, looking at FIGURE 5, and the pin 118 is received in recess 120. It will be appreciated that this mechanical coupling assures that when the exterminating compartment door 68 is closed, the housing doors 22 and 24 are both open. In like manner, when the housing doors 22 and 24 are closed, the exterminating compartment door 68 is open.

As previously noted, the floor 64 is provided with high voltage exposed conductors 66. The floor 64 is pivotable about shaft 62. A floor tilt assembly shown in FIGURE 4 is provided for tilting the floor 64 about the shaft 62. The floor tilt assembly includes a solenoid 130 having an armature 132 operatively associated therewith. The armature 132 is pinned at 134 to a first arm 136 and a bell crank 138. Both the arm 136 and the bell crank 138 are pivotally mounted on pin 140. Arm 142 is terminally fixed to the bell crank 138 and is likewise secured to an arm 144 fixed to the floor 64. A coil spring extends between the arm 142 and an eye 150 fixed to a partition 152 as shown in FIGURE 4. When the solenoid 130 is energized, the armature 132 is retracted and the pin 134 pivots the bell crank 138 counterclockwise about pin 140 and accordingly drives the arm 142, arm 144 and floor 64 clockwise, as illustrated in FIGURE 4, about shaft 62 in the direction of the arrow. The armature 132 serves a further function. The arm 136 is pivoted about pin 140 and a projection 154 is moved counterclockwise and is adapted to engage a leaf 156 of switch 158 to open the switch. The significance of this action will be more readily understood when attention is drawn to the schematic diagram of FIGURE 6 and the operation of the invention. The tray 160 is disposed on partition 34 immediately beneath the floor 64 and is accessible when the side panel 26 is pivoted to the dotted line position shown in FIGURE 4 about the hinge 30.

Figure 6:
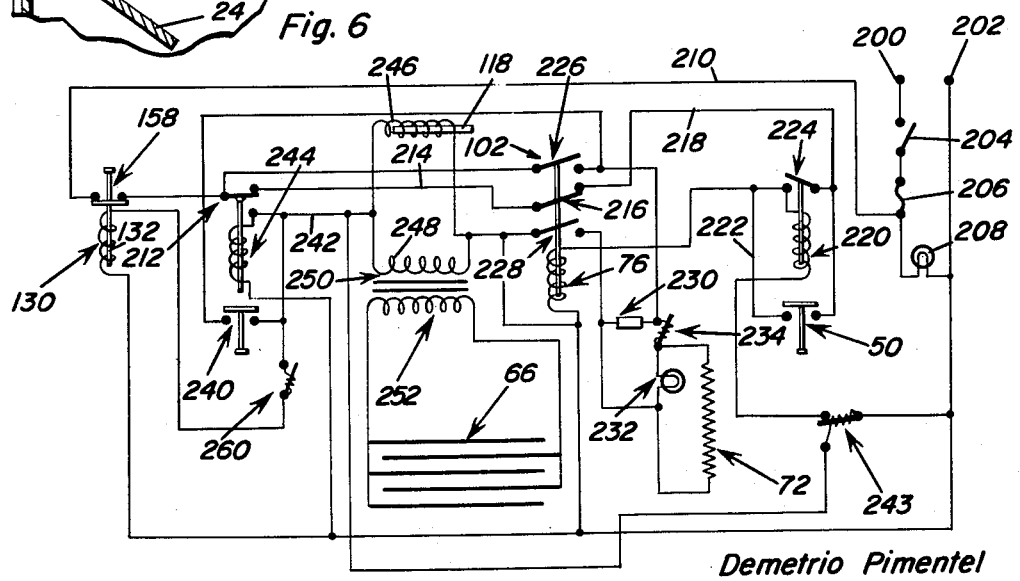
FIGURE 6 is a schematic wiring diagram of the electrical means employed in the rodent exterminator.

Particular attention is now called to FIGURE 6 wherein the electrical circuitry of the invention is illustrated. Initially, a conventional 115-volt alternating current source is applied across terminals 200 and 202. A main line cut-off switch 204 is interposed between terminal 200 and fuse 206. A pilot light 208 is preferably electrically connected between the fuse 206 and the terminal 202. It is contemplated that the pilot light comprise a pair of green pin point lights so as to act as an attraction to a rodent. Conductor 210 extends from the fuse 206 to the normally closed switch 158 and thence through single-pole double-throw switch 212 through conductor 214 through normally closed section 216 of the switch bank 102, through conductor 218, to the normally opened switch 50. It will be recalled switch 50 is normally opened but is closed by contact with the floor grill 42 through hanger 48. Accordingly, when a rodent enters the housing through the entrances proximate the doors 22 and 24, engagement with the floor grill 42 above the food compartment in member 52, causes the closing of switch 50. As shown in FIGURE 3, the hanger 48 has an upper hook which extends through a bore in a downwardly extending operating arm connected to switch 50 so that as the arm is pulled down by the weight of a rodent, it cuts on the switch. Coil 220 is thereby energized through conductor 222. Energization of coil 220 causes the closure of normally open switch 224, thereby energizing the door assembly solenoid 76. The solenoid 76, as appreciated from FIGURE 5, acts on armature 78 to close the doors 22 and 24 so as to prevent the rodent from escaping from the trapping compartment 40. Simultaneously, the exterminating compartment door 68 is opened and the projection 100 is moved against the switch bank 102 so as to open the normally closed section 216, and close the normally open sections 226 and 228. Conductor 210 then extends through switch 158 and switch 226 providing one side of the line to outlet 230, lamp 232, and heater 72, previously mentioned. Moreover, a flasher element 234 is provided. The flashing of the lamp 232 and the heat emitted by the heating means 72 cause the rodent in the trapping chamber 40 to climb the ramp 60 leading to the exterminating compartment 74. The rodent in the exterminating compartment 74 engages a switch actuator (not shown) conveniently provided to close normally open switch 240. The closing of normally open switch 240 applies one side of the line through the switch 158 and section 226 of the switch bank 102 to the conductor 242 causing the energization of coil 244, coil 246, and primary 248 of transformer 250. Energization of coil 246 withdraws pin 118 which releases angle member 114. The energization of coil 244 moves its single-pole double-throw switch from conductor 214 to conductor 242 thereby de-energizing the solenoid 76 which in turn releases the housing doors 22 and 24 and the exterminating compartment door 68 back to their original positions; that is, the housing doors 22 and 24 in an open position and the exterminating compartment door 68 in a closed position. The doors may be returned to their original positions by spring means 116 shown in FIGURE 5. It will further be realized that energization of the primary 248 of transformer 250 applies a high voltage, contemplated in the order of 450-volts in the secondary coil 252 of the transformer which may be any of a number of well-known types of transformers. The voltage from the secondary coil 252 of transformer 250 is impressed on the exposed high voltage conductor 66 supported on the floor 64 of the exterminating compartment 74. It will further be appreciated that the rodent has been sealed in the exterminating compartment 74 when the exterminating compartment door 68 closed at the time the housing doors 22 and 24 opened. The high voltage of the exposed high voltage conductors 66 will of course electrocute the rodent. The voltage on conductor 242 is impressed on the solenoid coil 130 through time delay element 260. The time delay element 260 is preferably of the heated bi-metallic variety. Accordingly, the solenoid 130 will be energized a predetermined time after high voltage is impressed on the exposed high voltage conductor 66. Of course the predetermined time should be such as would allow the electrocution of the rodent. As noted previously, the energization of the solenoid 130 causes the tilting of the floor 64 and the disposal of the rodent from the exterminating chamber 74 into the tray 160. Energization of the coil 130 causes switch 158 to open when the projection 154 engages leaf 156. The opening of switch 158 opens the circuit through conductor 210 and resets the entire system.

It also should be noted that when voltage was applied to conductor 242, limit heater 243 was energized opening the circuit to one side of coil 220 for the purpose of preventing a rodent from actuating the floor switch 50 as long as voltage is present on the conductor 242.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rodent exterminator comprising a housing defining a trapping compartment, an exterminating compartment connected by a first passage to said trapping compartment, and a rodent storage compartment connected by a second passage to said exterminating compartment, said housing including a housing entrance in communication with said trapping compartment, movable housing doors disposed in said housing entrance, means in said exterminating compartment for killing said rodent and causing its body to move into said storage compartment, a perforated floor in said trapping compartment, a bait compartment in the trapping compartment below said floor, switch means operatively connected to said floor, power means connected to said switch means and doors whereby the weight of a rodent on said floor will operate said switch to energize said power means for closing the housing doors.

2. A rodent exterminator comprising a housing defining a trapping compartment, an exterminating compartment connected by a first passage to said trapping compartment, and a rodent storage compartment connected by a second passage to said exterminating compartment, said housing including a housing entrance in communication with said trapping compartment, movable housing doors disposed in said housing entrance, means in said exterminating compartment for killing said rodent and causing its body to move into said storage compartment, said trapping compartment including a suspended floor grill, a food compartment disposed immediately beneath said grill, and first switch means operatively connected to said suspended grill operated by the weight of said rodent to energize a power means, said power means when energized closing said housing doors.

3. A rodent exterminator comprising a housing defining a trapping compartment, an exterminating compartment connected by a first passage to said trapping compartment, and a rodent storage compartment connected by a second passage to said exterminating compartment, said housing including a housing entrance in communication with said trapping compartment, movable housing doors disposed in said housing entrance, means in said exterminating compartment for killing said rodent and causing its body to move into said storage compartment, said trapping compartment including a suspended floor grill, a food compartment disposed immediately beneath said grill, and first switch means operatively connected to said suspended grill operated by the weight of said rodent to energize a power means, said power means when energized closing said housing doors, heating means disposed in said trapping compartment, said heating means electrically connected to said first switch means.

4. A rodent exterminator comprising a housing defining a trapping compartment, an exterminating compartment connected by a first passage to said trapping compartment, and a rodent storage compartment connected by a second passage to said exterminating compartment, said housing including a housing entrance in communication with said trapping compartment, movable housing doors disposed in said housing entrance, means in said exterminating compartment for killing said rodent and causing its body to move into said storage compartment, said trapping compartment including a suspended floor grill, a food compartment disposed immediately beneath said grill, and first switch means operatively connected to said suspended grill operated by the weight of said rodent to energize a power means, said power means when energized closing said housing doors, said power means mechanically coupled to said housing doors and including an assembly solenoid said assembly solenoid electrically coupled to said first switch means.

5. A rodent exterminator comprising a housing defining a trapping compartment, an exterminating compartment connected by a first passage to said trapping compartment, and a rodent storage compartment connected by a second passage to said exterminating compartment, said housing including a housing entrance in communication with said trapping compartment, movable housing doors disposed in said housing entrance, means in said exterminating compartment for killing said rodent and causing its body to move into said storage compartment, said trapping compartment including a suspended floor grill, a food compartment disposed immediately beneath said grill, and first switch means operatively connected to said suspended grill operated by the weight of said rodent to energize a power means, said power means when energized closing said housing doors, heating means disposed in said trapping compartment, said heating means electrically connected to said first switch means, a ramp in said trapping compartment heated by said heating means, said ramp extending between said floor grill and said exterminating compartment.

6. A rodent exterminator comprising a housing defining a trapping compartment, an exterminating compartment connected by a first passage to said trapping compartment, and a rodent storage compartment connected by a second passage to said exterminating compartment, said housing including a housing entrance in communication with said trapping compartment, movable housing doors disposed in said housing entrance, means in said exterminating compartment for killing said rodent and causing its body to move into said storage compartment said trapping compartment including a suspended floor grill, a food compartment disposed immediately beaneath said grill, and first switch means operatively connected to said suspended grill, heating means disposed in said trapping compartment, said heating means electrically connected to said first switch means, a ramp in said trapping compartment heated by said heating means, said ramp extending between said floor grill and said exterminating compartment, a door actuator assembly, said assembly mechanically coupled to said housing doors, said assembly including an assembly solenoid, said assembly solenoid electrically coupled to said first switch means, an exterminating compartment door disposed between said exterminating compartment and said ramp in said first passage, means connecting said exterminating compartment door and said housing doors closing said exterminating compartment door when said housing doors are open and closing said housing doors when said exterminating compartment door is open.

7. A rodent exterminator comprising a housing defining a trapping compartment, an exterminating compartment connected by a first passage to said trapping compartment, and a rodent storage compartment connected by a second passage to said exterminating compartment, said housing including a housing entrance in communication with said trapping compartment, movable housing doors disposed in said housing entrance, means in said exterminating compartment for killing said rodent and causing its body to move into said storage compartment, said trapping compartment including a suspended floor grill, a food compartment displosed immediately beneath said grill, and first switch means operatively connected to said suspended grill operated by the weight of said rodent to energize a power means, said power means when energized closing said housing doors, heating means disposed in said trapping compartment, said heating means electrically connected to said first switch means, a ramp in said trapping compartment heated by said heating means, said ramp extending between said floor grill and said exterminating compartment, said power means mechanically coupled to said housing doors and including an assembly solenoid, said assembly solenoid electrically coupled to said first switch means, second switch means disposed in said exterminating compartment and a switch actuator in said exterminating compartment coupled to said second switch means, circuit means connecting said second switch means to said power means and killing means so that said power means is deenergized and the killing means is energized when said second switch is closed by said actuator.

8. A rodent exterminator comprising a housing defining a trapping compartment, an exterminating compartment, and a rodent storage compartment, said housing including a housing entrance in communication with said trapping compartment, movable housing doors disposed in said housing entrance, said trapping compartment including a suspended floor grill, a food compartment disposed immediately beneath said grill, and first switch means operatively connected to said suspended grill, heating means disposed in said trapping compartment, said heating means electrically connected to said first switch means, a ramp in said trapping compartment, said ramp extending between said floor grill and said exterminating compartment, said power means mechanically coupled to said housing doors and including an assembly solenoid, said assembly solenoid electrically coupled to said first switch means, said exterminating compartment including a pivotally mounted floor, and exposed high voltage conductors supported on said floor and adapted to be connected to a source of high voltage current.

9. A rodent exterminator comprising a housing defining a trapping compartment, an exterminating compartment, and a rodent storage compartment, said housing including a housing entrance in communication with said trapping compartment, movable housing doors disposed in said housing entrance, said trapping compartment including a suspended floor grill, a food compartment disposed immediately beneath said grill, and first switch means operatively connected to said suspended grill, heating means disposed in said trapping compartment, said heating means electrically connected to said first switch means, a ramp in said trapping compartment, said ramp extending between said floor grill and said exterminating compartment, a door actuator assembly, said assembly mechanically coupled to said housing doors, said assembly including an assembly solenoid, said assembly solenoid electrically coupled to said first switch means, said exterminating compartment including a pivotally mounted floor, and exposed high voltage conductors supported on said floor, second switch means disposed in said exterminating compartment, and a switch actuator in said exterminating compartment coupled to said second switch means, said second switch means electrically connected to said exposed conductors.

10. A rodent exterminator comprising a housing defining a trapping compartment, an exterminating compartment, and a rodent storage compartment, said housing including a housing entrance in communication with said trapping compartment, movable housing doors disposed in said housing entrance, said trapping compartment including a suspended floor grill, a food compartment disposed immediately beneath said grill, and first switch means operatively connected to said suspended grill, heating means disposed in said trapping compartment, said heating means electrically connected to said first switch means, a ramp in said trapping compartment, said ramp extending between said floor grill and said exterminating compartment, a door actuator assembly, said assembly mechanically coupled to said housing doors, said assembly including an assembly solenoid, said assembly solenoid electrically coupled to said first switch means, said exterminating compartment including a pivotally mounted floor, and exposed high voltage conductors supported on said floor, second switch means disposed in said exterminating compartment, and a switch actuator in said exterminating compartment coupled to said second switch means, said second switch means electrically connected to said exposed conductors, an exterminator compartment solenoid, means including a time delay element electrically connecting said exterminator compartment solenoid to said second switch means.

11. A rodent exterminator comprising a housing defining a trapping compartment, an exterminating compartment, and a rodent storage compartment, said housing including a housing entrance in communication with said trapping compartment, movable housing doors disposed in said housing entrance, said trapping compartment including a suspended floor grill, a food compartment disposed immediately beneath said grill, and first switch means operatively connected to said suspended grill, heating means disposed in said trapping compartment, said heating means electrically connected to said first switch means, a ramp in said trapping compartment, said ramp extending between said floor grill and said exterminating compartment, a door actuator assembly, said assembly mechanically coupled to said housing doors, said assembly including an assembly solenoid, said assembly solenoid electrically coupled to said first switch means, said exterminating compartment including a pivotally mounted floor, and exposed high voltage conductors supported on said floor, second switch means disposed in said exterminating compartment, and a switch actuator in said exterminating compartment coupled to said second switch means, said second switch means electrically connected to said exposed conductors, an exterminator compartment solenoid, means including a time delay element electrically connecting said exterminator compartment solenoid to said second switch means, and a floor tilt assembly coupling said pivotally mounted floor to said exterminator solenoid whereby actuation of said solenoid will cause said floor to tilt.

12. A rodent exterminator comprising a housing defining a trapping compartment, an exterminating compartment, and a rodent storage compartment, said housing including a housing entrance in communication with said trapping compartment, movable housing doors disposed in said housing entrance, said trapping compartment including a suspended floor grill, a food compartment disposed immediately beneath said grill, and first switch means operatively connected to said suspended grill, heating means disposed in said trapping compartment, said heating means electrically connected to said first switch means, a ramp in said trapping compartment, said ramp extending between said floor grill and said exterminating compartment, a door actuator assembly, said assembly mechanically coupled to said housing doors, said assembly including an assembly solenoid, said assembly solenoid electrically coupled to said first switch means, said exterminating compartment including a pivotally mounted floor, and exposed high voltage conductors supported on said floor, second switch means disposed in said exterminating compartment, and a switch actuator in said exterminating compartment coupled to said second switch means, said second switch means electrically connected to said exposed conductors, an exterminator compartment solenoid, means including a time delay element electrically connecting said exterminator compartment solenoid to said second switch means, and a floor tilt assembly coupling said pivotally mounted floor to said exterminator solenoid whereby actuation of said solenoid will cause said floor to tilt, said rodent storage compartment disposed immediately beneath said pivotally mounted floor, said storage compartment including a removable tray.

References Cited in the file of this patent

UNITED STATES PATENTS

| | | |
|---|---|---|
| 2,247,931 | Vincent et al. | July 1, 1941 |
| 2,377,967 | | |
| 2,411,766 | | |
| 2,445,166 | | |
| 2,544,730 | | |
| 2,677,209 | | |
| 2,995,862 | | |
| | Rice | June 12, 1945 |
| | Vincent et al. | Nov. 26, 1946 |
| | Crumrine | July 13, 1948 |
| | Schulz | Mar. 13, 1951 |
| | Hutchison | May 4, 1954 |
| | Pimentel | Aug. 15, 1961 |